United States Patent
Miranda et al.

(10) Patent No.: US 12,029,227 B2
(45) Date of Patent: Jul. 9, 2024

(54) METHOD FOR REDUCING THE INCIDENCE OF PECTORAL MYOPATHY IN POULTRY FEED

(71) Applicant: CAN TECHNOLOGIES, INC., Wayzata, MN (US)

(72) Inventors: Daniel Jose Antoniol Miranda, Wayzata, MN (US); Alvaro Medina Dubois, Wayzata, MN (US); Alessandro Augusto Plenter Belucio, Wayzata, MN (US)

(73) Assignee: CAN TECHNOLOGIES, INC., Wayzata, MN (US)

( * ) Notice: Subject to any disclaimer, the term of this patent is extended or adjusted under 35 U.S.C. 154(b) by 611 days.

(21) Appl. No.: 16/641,510

(22) PCT Filed: Aug. 22, 2018

(86) PCT No.: PCT/IB2018/001490
§ 371 (c)(1),
(2) Date: Feb. 24, 2020

(87) PCT Pub. No.: WO2019/073307
PCT Pub. Date: Apr. 18, 2019

(65) Prior Publication Data
US 2021/0127713 A1 May 6, 2021

(30) Foreign Application Priority Data
Aug. 24, 2017 (BR) .......................... 102017018191.0

(51) Int. Cl.
| | | |
|---|---|---|
| *A23K 50/75* | (2016.01) | |
| *A23K 20/111* | (2016.01) | |
| *A23K 20/174* | (2016.01) | |
| *A23K 20/24* | (2016.01) | |
| *A23K 20/142* | (2016.01) | |

(52) U.S. Cl.
CPC ............ *A23K 50/75* (2016.05); *A23K 20/111* (2016.05); *A23K 20/174* (2016.05); *A23K 20/24* (2016.05); *A23K 20/142* (2016.05)

(58) Field of Classification Search
None
See application file for complete search history.

(56) References Cited

U.S. PATENT DOCUMENTS

| | | | | |
|---|---|---|---|---|
| 3,639,584 A | * | 2/1972 | Klenholz | ............... A23K 20/22 424/718 |
| 10,967,002 B2 | * | 4/2021 | Van Den Bosch | .... A23K 50/30 |
| 2004/0234626 A1 | | 11/2004 | Gardiner | |
| 2011/0313043 A1 | | 12/2011 | Kramer | |

FOREIGN PATENT DOCUMENTS

| | | |
|---|---|---|
| DE | 102007020378 A1 | 11/2008 |
| WO | WO 2015/184311 | * 12/2015 |
| WO | 2016090366 A1 | 6/2016 |

OTHER PUBLICATIONS

Bianchi et al. "The Occurrence of Deep Pectoral Myopathy in Roaster Chickens", Poultry Science, 2006; 85(10): 1843-1846.
Christensen et al., "The effect of added L-arginine on the severity of woody breast and white striping in male broilers," University of Arkansas, Fayetteville, AR—poster 450 P, presented during the 104th Annual Meeting of the Poultry Science Association (United States), from Jul. 27 to 30, 2015, 2 pages.
Froning et al., "Color of Poultry Meat as Influenced by Dietary Nitrates and Nitrites", Poultry Science, vol. 48, No. 2, Mar. 1, 1969 (Mar. 1, 1969), pp. 668-674, XP055765517, Oxford ISSN: 0032-5791, DOI: 10.3382/ps.0480668.
Kuttappan et al., "White striping and woody breast myopathies in the modern poultry industry: a review", Poultry Science, vol. 95, No. 11, Nov. 1, 2016 (Nov. 1, 2016), pp. 2724-2733, XP055802495, Oxford ISSN: 0032-5791, DOI:10.3382/ps/pew216.
Sams et al., "Comparison of two shearing methods for objective tenderness evaluation and two sampling times for physical-characteristic analyses of early-harvested broiler breast meat." Poultry Science. Feb. 1, 1990;69(2):348-353.
Siller, "Deep Pectoral Myopathy: A Penalty of Successful Selection for Muscle Growth", Poultry Science, vol. 64, No. 8, Aug. 1, 1985 (Aug. 1, 1985) , pp. 1591-1595, XP055802606, Oxford ISSN: 0032-5791, DOI: 10.3382/ps.0641591.

* cited by examiner

*Primary Examiner* — Vera Afremova

(57) ABSTRACT

The present invention relates to an additive to poultry feed including nitrates, nitrites or their mixtures that reduces the incidence of pectoral myopathy in poultry, for example, wooden breast myopathy in broiler chickens. In one aspect, a method for reducing the incidence of pectoral myopathy in poultry is disclosed. The method includes feeding poultry a feed having one or more nitrates, one or more nitrites, or a mixture thereof, wherein the amount of nitrates and/or nitrites in the feed is 3 g to 2,500 g per ton of feed.

9 Claims, 2 Drawing Sheets

METHOD FOR REDUCING THE INCIDENCE OF PECTORAL MYOPATHY IN POULTRY FEED

CROSS-REFERENCE TO RELATED APPLICATIONS

This application is a national phase application of International Application No. PCT/IB2018/001490, filed 22 Aug. 2018, which claims the benefit of Brazil Patent Application No. 102017018191.0, filed 24 Aug. 2017, each of which is hereby incorporated by reference in its entirety.

This invention, in general, is with respect to an additive to poultry feed that includes nitrates, nitrites or their mixtures, which seeks to reduce the incidence of pectoral myopathy, for example, which is referred to as wooden breast myopathy in broiler chickens. This invention also refers to feed for broiler chickens formulated with an additive that includes one or more nitrates, one or more nitrites or their mixtures, to reduce the incidence of wooden breast myopathy in chickens. Another aspect of this invention is with respect to a method of treating broiler chickens to reduce the incidence of wooden breast myopathy.

STATE-OF-THE-ART

In the following text, the incidence of wooden breast myopathy in broiler chickens is used solely by way of facilitating the explanation, but it should be understood that the reference covers pectoral myopathy in birds in general.

Wooden breast myopathy is known in the state-of-the-art, and there have been reports on it for several years. It is a myopathy typically seen in rapid-growth chickens, characterized by abnormal rigidity of the chest muscle (pectoralis major), more specifically in heavier chickens and those with larger breasts. The differences in tenderness are evident between normal fillets and fillets that have wooden breast, for example, that have been measured using Warner-Bratzler cut values. Another known test is the test that gauges the tenderness of chicken breasts, which is included in "*Comparison of two shearing methods for objective tenderness evaluation and two sampling times for physical-characteristic analyses of early harvested broiler breast meat*," by Sams A. R., Janky D. M. and Woodward S. A., 1990, published in Poultry Science 69, 348-353.

While this characteristic of tenderness is not a threat to human health, consumers tend to reject chicken breasts that present this abnormality based on sensory aspects, for example, an undesirable texture, which results in significant financial losses, particularly for producers of broiler chickens, as integrators (which are the companies that make decisions/have control of the majority of the production process, for example, from production of one-day-old chicks to commercialization of products processed from bird meat), and refrigerators.

While the undesirable texture of wooden breast chicken fillets may be resolve by grinding, there are reports that compositional changes in chicken breasts may result in impaired functionality in processed products. Examples of this impaired functionality include decreased capacity to retain seasonings and greater loss when cooking chicken breasts.

Loss in cooking is the degree of meat shrinkage during cooking. The total loss that occurs during cooking the meat includes the losses known as dripping, and losses of volatile compounds. The majority of volatile compound loss is through water evaporation, and it may include volatile substances of decomposition of fat and of volatile aromatic substances. The dripping includes fat, water, salts, nitrogenated and non-nitrogenated extracts.

There are reports in the state-of-the-art about attempts to resolve wooden breast myopathy, such as supplementing feed with vitamin E and vitamin C, minerals such as selenium, zinc, manganese and copper (in its inorganic and organic form), lysine, antioxidants, phytase, arginine, creatine and their combinations. While some of these alternatives provide some beneficial effects against wooden breast myopathy, the problem persists.

SUMMARY OF THE INVENTION

From one point of view, this invention is with respect to a method to reduce pectoral myopathy in broiler chickens, particularly wooden breast myopathy, characterized by the fact that it includes the stage of feeding the birds—such as chickens, ducks, turkeys and geese, and particularly broiler chickens—with feed that includes an additive that is comprised of one or more nitrates, one or more nitrites, or their mixtures. Such poultry feeding is continuous or discontinuous until the day of slaughter—with the day for slaughtering broiler chickens being normally 30 to 60 days, particularly more than 40 days from the date the birds hatch.

The invention also refers to feed intended to reduce the incidence of pectoral myopathy in birds, characterized by including an additive (for example, in the form of a powder, granules, bran or pellets) that includes at least one or more nitrates, one or more nitrites, or their mixtures, in quantities that vary, for example, between 3 g and 2500 g per ton of feed for broiler chickens. Such an additive may also include one or more active agents chosen from among antioxidants, anti-inflammatories, anti-hyperlipidemics, probiotics, prebiotics, vitamins, minerals, amino acids, vasodilators, PLA2 inhibitors (phospholipase A2), and phytases. Antioxidants optionally included in the additive to the poultry feed according to the invention vary, for example, within the interval of 10 g to 1000 g per ton of feed, chosen from among polyphenols (for example, grape seed extract, onion extract, rosemary extract or their mixtures), vitamins (for example vitamin C, vitamin E or their mixtures), minerals (for example selenium, zinc, manganese, copper or their mixtures) and their mixtures.

Nitrates added to the poultry feed in this invention may be one or more of calcium nitrate, sodium nitrate, magnesium nitrate, potassium nitrate, nitroglycerine, isosorbide mononitrate or isosorbide dinitrate, isosorbide mononitrate-5, erythritol tetranitrate, pentaerythritol tetranitrate and their mixtures. The nitrites in the additive to the poultry feed in this invention may be one or more of sodium nitrite, isobutyl nitrite, isopropyl nitrite, isoamyl nitrite, isopentyl nitrite, cyclohexyl nitrite, ammonium nitrite, calcium nitrite, potassium nitrite and their mixtures. When the additive to the poultry feed, according to the invention, is comprised of one or more nitrates and one or more nitrites, in a percentage ratio of weight between nitrates and nitrites varying from 0:100 to 100:0.

DETAILED DESCRIPTION OF THE INVENTION

Figure 1:
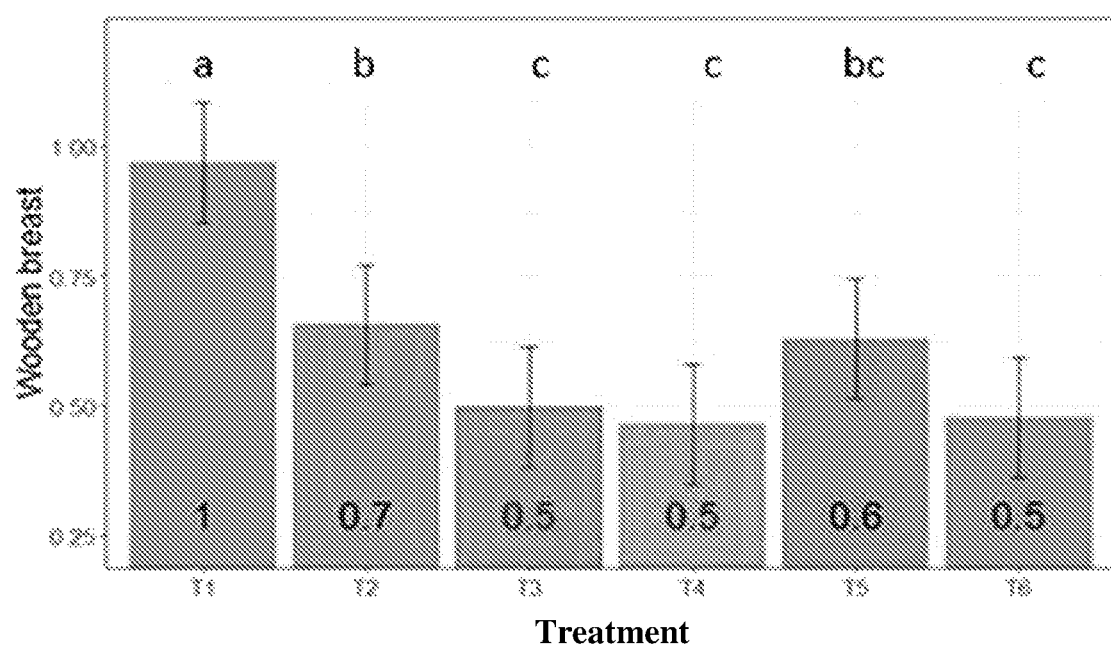
FIG. 1 is a graph showing the effect of various diets on wooden breast incidence in broiler chickens.
Figure 2:
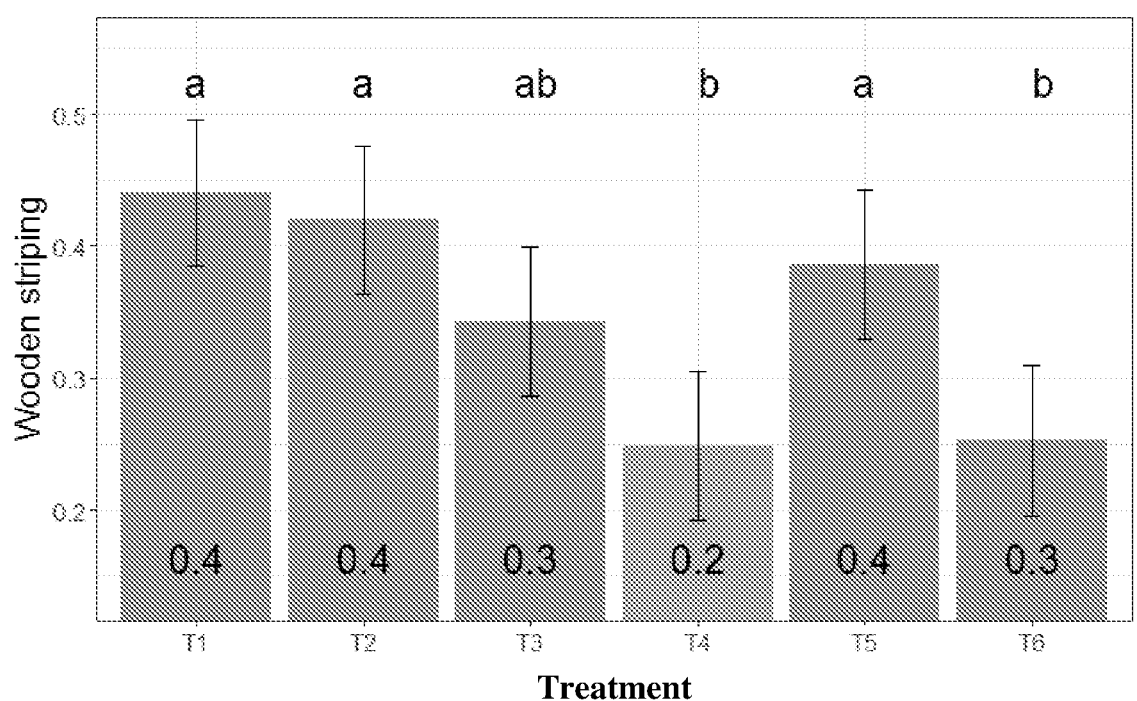
FIG. 2 is a graph showing the effect of various diets on white striping incidence in broiler chickens.

This invention is based on the finding that one or more nitrates, one or more nitrites, or their mixtures, are useful in reducing the incidence of pectoral myopathy in poultry, especially wooden breast myopathy in broiler chickens. The invention is also useful for reducing the incidence of white striping myopathy in poultry. Wooden breast and white striping myopathies are two of the most common myopathies which affect poultry meat quality. White Striping (WS) is a condition characterized by the occurrence of white striations parallel to muscle fibers on the muscles of poultry, while Woody Breast (WB) is characterized by abnormal harness and rigidity on the breast fillet of poultry.

White striping and woody breast myopathies in the modern poultry industry: A review|Request PDF. Available from: https://www.researchgate.net/publication/305629671_White_striping_and_woody_breast myopathies in the modern poultry industry A review [accessed Aug. 22 2018].

Without being bound by theory, it is believed that nitrates, nitrites, or their mixtures increase vasodilation through the metabolism of nitric oxide (the cycle of nitrate/nitrite/nitric oxide). This improves irrigation of the muscular fibers in poultry breasts, thus preventing degradation and necrosis of those muscular fibers and reducing the incidence of wooden breast myopathy.

This effect is surprising considering the fact that the previous state-of-the-art relates that arginine, a typical provider of nitric oxide, has been inefficient in providing effective reduction of wooden breast. See, for example, "*The effect of added L-arginine on the severity of woody breast and white striping in male broilers*," Karen Christensen, Casey Owens and Michael Kidd, University of Arkansas, Fayetteville, AR—poster 450 P, presented during the 104$^{th}$ Annual Meeting of the Poultry Science Association (United States), from July 27 to 30, 2015, available at http://www.poultryscience.org/psa15/Abstracts/145.pdf.

The effect of including one or more nitrates, one or more nitrites, or their mixtures as an additive to the poultry feed in order to reduce the incidence of pectoral myopathy is also surprising, considering the potential toxicity. Despite the fact that nitrate in and of itself is not toxic, after ingestion it is converted into a toxic form of nitrite by microorganisms found in the intestinal tract of birds. Once absorbed by the bloodstream, this nitrite binds strongly to hemoglobin and reduces the capacity of oxygen transport through the blood. Chronic toxicity from nitrates or nitrites may cause reduced growth, anorexia and poor motor coordination.

From one viewpoint, however, the invention is with regard to the use of one or more nitrates, one or more nitrites, or their mixtures, characterized by being like an additive in the preparation of poultry feed, particularly broiler chickens, intended to reduce the incidence of pectoral myopathy, particularly wooden breast myopathy.

From another viewpoint, the invention is in regard to poultry feed that is characterized by having an additive that includes one or more nitrates, one or more nitrites, or their mixtures. In a specific mixture of the invention it also contains one or more antioxidants. Antioxidants are known additives used in feeding birds that seek to improve rates of viability, maintain animal health, improve and productive and reproductive performance.

From yet another viewpoint, this invention is in regard to a method to reduce the incidence of pectoral myopathy in poultry, particularly wooden breast myopathy, characterized by including the stage of feeding the birds, especially chickens, with one or more nitrates, one or more nitrites, or their mixtures. In one particular example the method of the invention is characterized by the stage of feeding the poultry with one or more nitrates, one or more nitrites, or their mixtures, and one or more antioxidant agents. In another regard, the invention is characterized by including the poultry-feeding stage with feed that contains an additive that includes one or more nitrates, one or more nitrites, or their mixtures.

The word "reduction" in the expression "reduction of the incidence of pectoral myopathy in poultry" used in this document is also understood to be prevention, barrier, impediment, limitation, inhibition or block, in comparison with the incidence of pectoral myopathy in poultry that normally occurs when birds are not fed with one or more nitrates, one or more nitrites, or their mixtures, according to the invention.

DETAILED DESCRIPTION

The mentioned one or more nitrates, one or more nitrites, and their mixtures, added as an additive to poultry feed in accordance with the invention, may be of any type and origin, organic and inorganic, the most preferred being those that have a lower toxic effect on the metabolism of the birds. For the purposes of this disclosure, the phrase "one or more nitrates, one or more nitrites, and their mixtures" with respect to the additive used in the compositions and methods described herein can refer to an additive including only one or more nitrates, only one or more nitrites, or mixtures of one or more nitrates and one or more nitrites.

Particular nitrates that are appropriate as an additive in poultry feed in accordance with the invention are one or more of the following: calcium nitrate, sodium nitrate, magnesium nitrate, potassium nitrate, nitroglycerine, isosorbide mononitrate or isosorbide dinitrate, isosorbide mononitrate-5, erythrityl tetranitrate, pentaerythritol tetranitrate and their mixtures.

Particular nitrites, appropriate as additives in poultry feed in accordance with the invention, are one or more of the following: sodium nitrite, isobutyl nitrite, isopropyl nitrite, isoamyl nitrite, isopentyl nitrite, cyclohexyl nitrite, ammonium nitrite, calcium nitrite, potassium nitrite and their mixtures.

Particular additives, appropriate as additives in poultry feed in accordance with the invention, are mixtures of one or more nitrates (for example, those mentioned above) with one or more nitrites (for example, those mentioned above). The percentage ratio of the weight of nitrates to nitrites normally varies between 0:100 to 100:0. In some embodiments, the percentage ratio of the weight of nitrates to nitrites is in the range of 100:0 to 90:10; in the range of 90:10 to 80:20; in the range of 80:20 to 70:30; in the range of 70:30 to 60:40; or in the range of 60:40 to 50:50.

In a particular aspect of the invention, the quantity of one or more nitrates, one or more nitrites, or their mixtures, varies between 3 g and 2,500 g per ton of poultry feed. In some embodiments, the quantity of nitrates and/or nitrites is in the range of 400 g to 2,100 g per ton of feed. In some embodiments, the quantity of nitrates and/or nitrites is in the range of 50 g to 1,500 g per ton of feed. In some embodiments, the quantity of nitrates and/or nitrites is in the range of 100 g to 1,000 g per ton of feed. In some embodiments, the quantity of nitrates and/or nitrites is in the range of 400 g to 1,500 g per ton of feed. In some embodiments, the quantity of nitrates and/or nitrites is in the range of 250 g to 750 g per ton of feed. In some embodiments, the quantity of nitrates and/or nitrites is in the range of 400 g to 600 g per ton of feed. In some embodiments, the quantity of nitrates and/or nitrites is in the range of 800 g to 1,200 g per ton of feed. In some embodiments, the quantity of nitrates and/or nitrites is in the range of 1,800 g to 2,200 g per ton of feed.

In some embodiments, the quantity of nitrates is in the range of 3 g to 2,500 g per ton of feed. In some embodiments, the quantity of nitrates is in the range of 100 g to 1,000 g per ton of feed. In some embodiments, the quantity of nitrates is in the range of 400 g to 600 g per ton of feed. In some embodiments, the quantity of nitrates in the feed is about 500 g per ton. In a preferred embodiment, the one or more nitrates is primarily calcium nitrate, for example, the quantity of nitrates is at least 90%, 95%, or 99% calcium nitrate.

The amount of one or more nitrates, one or more nitrites, or a mixture thereof fed to the poultry in the feed compositions and/or methods described herein can also be expressed in mg of nitrates and/or nitrites per kg body weight of the poultry. In some embodiments, the nitrate/nitrite amount in the feed composition is less than 500 mg/kg, less than 450 mg/kg, less than 400 mg/kg, or less than 300 mg/kg. In some embodiments, the nitrate/nitrate amount in the feed composition is in the range of 10 to 500 mg/kg, 10 to 400 mg/kg; 10 to 300 mg/kg; 25 to 400 mg/kg; 25 to 200 mg/kg; 50 to 400 mg/kg; 50 to 150 mg/kg; or 100 to 400 mg/kg. It has been determined that nitrate dosage up to at least 400 mg/kg body weight (provided as calcium nitrate) does not cause nitrate poisoning and does not negatively affect growth in broiler chickens (study conducted by feeding in both starter and grower phases, amounts above 400 mg/kg were not tested).

Poultry feed in the invention may also include additional active ingredients such as antioxidants, anti-inflammatories, anti-hyperlipidemics, probiotics, prebiotics, vitamins, minerals, amino acids, vasodilators, phospholipase A2 inhibitors (PLA2), and phytases.

Specific antioxidants that are useful as additional components (different from one or more nitrates, one or more nitrites or their mixtures) in the additive to poultry feed, in accordance with the invention, are polyphenols, vitamins, minerals and their mixtures. Specific sources of polyphenols are grape seed extract, onion extract, rosemary extract and their mixtures. Specific vitamins that are useful for the invention are vitamins C and E and their mixtures. Specific minerals that are useful for the invention are selenium, zinc, manganese, copper and their mixtures.

A specific content of antioxidants in the additive to the poultry feed in the invention varies between 10 g and 1,000 g per ton of feed. In some embodiments, the quantity of antioxidants in the feed is in the range of 10 to 500 ppm. In some embodiments, the quantity of antioxidants in the feed is in the range of 10 to 100 ppm. In some embodiments, the quantity of antioxidants in the feed is in the range of 40 to 60 ppm.

The additive in the invention may assume any physical form that is appropriate to be mixed into poultry feed, such as powder, granules, bran, pellets, etc.

Another aspect of the invention refers to a method for reducing the incidence of pectoral myopathy in poultry that is characterized by including the bird-feeding stage with feed that includes the additive described above, continuously or discontinuously, until the day of slaughter. In some embodiments, a feed comprising one or more nitrates, one or more nitrites, or a mixture thereof is fed to poultry during the starter phase. In some embodiments, a feed comprising one or more nitrates, one or more nitrites, or a mixture thereof is fed to poultry during the grower phase. In some embodiments, a feed comprising one or more nitrates, one or more nitrites, or a mixture thereof is fed to poultry during both the starter and the grower phase. In some embodiments, a feed comprising one or more nitrates, one or more nitrites, or a mixture thereof is fed to poultry daily for the first 5 days, 10 days, 15 days, 18 days, or 21 days, 28 days, 30 days, or 35 days after hatching. In some embodiments, a feed comprising one or more nitrates, one or more nitrites, or a mixture thereof is fed to poultry for at least 50% of the days during the first 5 days, 10 days, 15 days, 18 days, or 21 days, 28 days, 30 days, or 35 days after hatching. In some embodiments, a feed comprising one or more nitrates, one or more nitrites, or a mixture thereof is fed to poultry for at least 75% of the days during the first 5 days, 10 days, 15 days, 18 days, or 21 days, 28 days, 30 days, or 35 days after hatching.

The day that poultry is slaughtered is typically between 30 and 60 days, particularly more than 40 days from the date chicks are hatched.

A technician in the matter, with the help of the information and examples contained in this document, will be able to mix the invention in an equivalent manner, that is, execute it in a manner that is not explicitly shown but that will perform the same, or substantially the same function, to attain the same, or substantially the same result. Such equivalent realizations are within the scope of protection of the invention defined in the attached claims.

EXPERIMENTAL EXAMPLES

Example 1: Effect of Calcium Nitrate on Broiler Performance and Carcass Quality

Two sources of vasodilators, arginine and calcium nitrate, are compared in an assessment of broiler chicken performance and carcass quality. Nitrate diets showed a tendency for breast weight (BW) improvement compared to other diets. The nitrate diets significantly reduced the incidence of wooden breast (WB) and white striping (WS) compared to controls. A diet including 0.5 kg/ton of feed calcium nitrate and also an antioxidant blend and chelated Selenium demonstrated the lowest incidence of WB and WS.

Treatments
  (T1) Control—high density of DAA and energy
  (T2) T1+L-arginine (1 kg/T)+Proviox additive (50 ppm)+Chelated Se (0.2 ppm)
  (T3) T1+L-arginine (2 kg/T)+Proviox additive (50 ppm)+Chelated Se (0.2 ppm) supplemented until 18 days of age
  (T4) T1+Calcium nitrate (0.5 kg/T)+Proviox additive (50 ppm)+Chelated Se (0.2 ppm)
  (T5) T1+Calcium nitrate (1 kg/T)+Proviox additive (50 ppm)+Chelated Se (0.2 ppm)
  (T6) T1+Calcium nitrate (2 kg/T)+Proviox additive (50 ppm)+Chelated Se (0.2 ppm) Proviox additive is a blend of antioxidants.

Feed
  Wheat or Corn+Soybean meal-based diets
  0-18 days (crumbles)
  19-39 days (pellets)
  Measurements: weight, daily gain, feed intake, feed/gain ratio, mortality (%), WB and WS

TABLE 1

| | Diet composition | | | | | | | | | | |
|---|---|---|---|---|---|---|---|---|---|---|---|
| | 0-18 days | | | | | | 18-39 days | | | | |
| | T1 | T2 | T3 | T4 | T5 | T6 | T1 = T3 | T2 | T4 | T5 | T6 |
| Composition | | | | | | | | | | | |
| Wheat | 28 | 27 | 27 | 27 | 27 | 26 | 35 | 34 | 34 | 34 | 33 |
| corn | 25 | 25 | 25 | 25 | 25 | 25 | 24 | 24 | 24 | 24 | 24 |
| Soya meal | 39 | 39 | 39 | 39 | 39 | 39 | 30 | 30 | 30 | 30 | 30 |
| palm oil | | | | | | | 2.5 | 2.5 | 2.5 | 2.5 | 2.5 |
| soya oil | 2.3 | 2.3 | 2.3 | 2.3 | 2.3 | 2.3 | 3.4 | 3.4 | 3.4 | 3.4 | 3.4 |
| LYSINE 25/BLE 75 | 0.9 | 0.9 | 0.9 | 0.9 | 0.9 | 0.9 | 0.9 | 0.9 | 0.9 | 0.9 | 0.9 |
| METHIO 15/BLE 85 | 2.2 | 2.2 | 2.2 | 2.2 | 2.2 | 2.2 | 1.8 | 1.8 | 1.8 | 1.8 | 1.8 |
| THREONINE 10/BLE 90 | 0.6 | 0.6 | 0.6 | 0.6 | 0.6 | 0.6 | 0.6 | 0.6 | 0.6 | 0.6 | 0.6 |
| CARBONATE CALCIUM | 0.2 | 0.2 | 0.2 | 0.2 | 0.2 | 0.2 | 0.5 | 0.5 | 0.5 | 0.5 | 0.5 |
| PHOSPHATE BICALCIQUE | 0.9 | 0.9 | 0.9 | 0.9 | 0.9 | 0.9 | 0.4 | 0.4 | 0.4 | 0.4 | 0.4 |
| Se O (0.2 ppm) proviox (éq50UI vit E) | | 0.5 | 0.5 | 0.5 | 0.5 | 0.5 | | 0.5 | 0.5 | 0.5 | 0.5 |
| Arginine (1 kg/T) | | 0.5 | 1 | | | | | 0.5 | | | |
| Bolifor CNF (0.5 kg/T) | | | | 0.5 | 1 | 2 | | | 0.5 | 1 | 2 |
| PLT 1% PHY/XYL | 1 | 1 | 1 | 1 | 1 | 1 | 1 | 1 | 1 | 1 | 1 |
| ADJ. MONENSIN 0.5% | 0.5 | 0.5 | 0.5 | 0.5 | 0.5 | 0.5 | | | | | |
| Analyse | | | | | | | | | | | |
| EM STARTER ENZYME | 3000 | 3000 | 3000 | 3000 | 3000 | 3000 | | | | | |
| EM CROISSANCE ENZYME kcal/kg | | | | | | | 3300 | 3300 | 3300 | 3300 | 3300 |
| MAT ENZYME | 24 | 24 | 24 | 24 | 24 | 24 | 20 | 20 | 20 | 20 | 20 |
| LYSINE PAP | 13 | 13 | 13 | 13 | 13 | 13 | 11 | 11 | 11 | 11 | 11 |
| Ca enz/P Disp | 2.1 | 2.1 | 2.1 | 2.1 | 2.1 | 2.1 | 1.98 | 1.98 | 1.98 | 1.98 | 1.98 |
| Ca tot/P tot | 1.41 | 1.41 | 1.41 | 1.42 | 1.44 | 1.47 | 1.28 | 1.28 | 1.3 | 1.32 | 1.36 |
| MET + CYS PAP/LYS PAP | 0.75 | 0.75 | 0.75 | 0.75 | 0.75 | 0.75 | 0.75 | 0.75 | 0.75 | 0.75 | 0.75 |
| MET PAP/LYS PAP | 0.49 | 0.49 | 0.49 | 0.49 | 0.49 | 0.49 | 0.48 | 0.48 | 0.48 | 0.48 | 0.48 |
| THR PAP/LYS PAP | 0.62 | 0.62 | 0.62 | 0.62 | 0.62 | 0.62 | 0.62 | 0.62 | 0.62 | 0.62 | 0.62 |
| TRP PAP/LYS PAP | 0.20 | 0.20 | 0.20 | 0.20 | 0.20 | 0.20 | 0.200 | 0.200 | 0.200 | 0.200 | 0.200 |
| LEU PAP/LYS PAP | 1.25 | 1.25 | 1.25 | 1.25 | 1.25 | 1.25 | 1.26 | 1.26 | 1.26 | 1.26 | 1.26 |
| ARG PAP/LYS PAP | 1.11 | 1.19 | 1.27 | 1.11 | 1.11 | 1.11 | 1.08 | 1.17 | 1.08 | 1.08 | 1.08 |
| ILE PAP/LYS PAP | 0.75 | 0.75 | 0.75 | 0.75 | 0.75 | 0.75 | 0.74 | 0.74 | 0.74 | 0.74 | 0.74 |
| VAL PAP/LYS PAP | 0.78 | 0.78 | 0.78 | 0.78 | 0.78 | 0.78 | 0.78 | 0.78 | 0.78 | 0.78 | 0.78 |

TABLE 2

| Treatment | T1 Control | T2 T1 + Arg 1 kg/t + Se + Prov | T3 T1 + Arg 2 kg/t + Se + Prov 0-18 j | T4 T1 + 0.5 kg/t Bolifor CNF + Se + Prov | T5 T1 + 1 kg/t Bolifor CNF + Se + Prov | T6 T1 + 2 kg/t Bolifor CNF + Se + Prov | CV % | S.S. |
|---|---|---|---|---|---|---|---|---|
| Chicks weight (g) 0-18 days | 41.5 | 41.6 | 41.7 | 41.6 | 41.9 | 41.5 | 1.4 | ns |
| mortality (%) | 0.6 | 1.4 | 1.3 | 0.8 | 1.6 | 0.9 | | |
| weight (g) | 688 | 684 | 691 | 689 | 685 | 696 | 3.1 | ns |
| daily gain (g) | 35.9 | 35.7 | 36.1 | 35.9 | 35.7 | 36.3 | 3.3 | ns |
| feed intake (g) | 868 | 855 | 881 | 880 | 882 | 847 | 3.9 | ns |
| FCR | 1.342 | 1.324 | 1.350 | 1.356 | 1.365 | 1.292 | 4.3 | ns |
| 0-28 days | | | | | | | | |
| mortality (%) | 1.7 | 2.3 | 1.9 | 0.9 | 2.3 | 1.4 | | |
| weight (g) | 1459 | 1467 | 1458 | 1455 | 1475 | 1494 | 2.6 | ns |
| daily gain (g) | 50.6 | 50.9 | 50.6 | 50.5 | 51.2 | 51.9 | 2.7 | ns |
| feed intake (g) | 2153 | 2130 | 2152 | 2132 | 2162 | 2129 | 2.3 | ns |
| FCR | 1,505 (b) | 1,485 (ab) | 1,513 (b) | 1,505 (b) | 1,498 (b) | 1,460 (a) | 2.6 | 0.09 |
| 0-39 days | | | | | | | | |
| mortality (%) | 5.3 | 7.0 | 6.2 | 5.3 | 7.8 | 6.6 | | |
| weight (g) | 2202 | 2206 | 2219 | 2220 | 2255 | 2244 | 3.3 | ns |
| daily gain (g) | 55.4 | 55.5 | 55.8 | 55.9 | 56.7 | 56.5 | 3.4 | ns |
| feed intake (g) | 3742 | 3766 | 3771 | 3755 | 3845 | 3782 | 3.6 | ns |
| FCR | 1,674 (b) | 1,660 (b) | 1,666 (b) | 1,657 (ab) | 1,651 (ab) | 1,622 (a) | 2.2 | 0.14 |
| Std FCR at 2.2 kg | 1,674 (b) | 1,659 (b) | 1,662 (b) | 1,652 (ab) | 1,640 (ab) | 1,610 (a) | 2.7 | 0.13 |

TABLE 3

Zootechnical results - periods

| Treatment | Control | T1+ Arg 1 kg/t + Se + Prov | T1 + Arg 2 kg/t + Se + Prov 0-18 j | T1 + 0.5 kg/t Bolifor CNF + Se + Prov | T1 + 1 kg/t Bolifor CNF + Se + Prov | T1 + 2 kg/t Bolifor CNF + Se + Prov | CV % | S.S. |
|---|---|---|---|---|---|---|---|---|
| 0-18 days | | | | | | | | |
| daily gain (g) | 35.9 | 35.7 | 36.1 | 35.9 | 35.7 | 36.3 | 3.3 | ns |
| feed intake (g) | 868 | 855 | 881 | 880 | 882 | 856 | 3.9 | ns |
| FCR | 1.342 | 1.324 | 1.350 | 1.356 | 1.365 | 1.304 | 4.3 | ns |
| 18-28 days | | | | | | | | |
| daily gain (g) | 77.1 | 78.4 | 76.6 | 76.7 | 79.0 | 79.8 | 5.5 | ns |
| feed intake (g) | 1275 | 1268 | 1265 | 1251 | 1273 | 1270 | 2.5 | ns |
| FCR | 1.631 | 1.608 | 1.646 | 1.634 | 1.599 | 1.583 | 4.2 | ns |
| 28-39 days | | | | | | | | |
| daily gain (g) | 67.6 | 67.1 | 69.2 | 69.5 | 70.8 | 69.1 | 5.6 | ns |
| feed intake (g) | 1508 | 1523 | 1519 | 1525 | 1555 | 1533 | 8.1 | ns |
| FCR | 1.881 | 1.846 | 1.813 | 1.798 | 1.760 | 1.771 | 8.0 | ns |

FIG. 1: Wooden breast incidence

The invention claimed is:

1. A method for reducing the incidence of pectoral myopathy in poultry comprising:
   feeding poultry a feed, the feed comprising:
   one or more nitrates, one or more nitrites, or a mixture thereof, and
   one or more antioxidants comprising polyphenols, wherein:
   the amount of nitrates and/or nitrites in the feed is 3 g to 2,500 g per ton of feed;
   the feed comprises the one or more antioxidants in the range of 10 g to 1,000 g per ton of feed;
   the polyphenols comprise a mixture of polyphenol sources comprising grape seed extract, onion extract, and rosemary extract; and
   the method reduces the incidence of pectoral myopathy in poultry fed the feed compared to poultry not fed the feed.

2. The method of claim 1, wherein the feed further comprises one or more active agents selected from anti-inflammatories, anti-hyperlipidemics, probiotics, prebiotics, vitamins, minerals, amino acids, vasodilators, phospholipase A2 inhibitors, and phytases.

3. The method of claim 1, wherein the one or more nitrates are selected from calcium nitrate, sodium nitrate, magnesium nitrate, potassium nitrate, nitroglycerine, isosorbide mononitrate or isosorbide dinitrate, isosorbide mononitrate-5, erythrityl tetranitrate, pentaerythritol tetranitrate and mixtures thereof.

4. The method of claim 1, wherein the one or more nitrites are selected from sodium nitrite, isobutyl nitrite, isopropyl nitrite, isoamyl nitrite, isopentyl nitrite, cyclohexyl nitrite, ammonium nitrite, calcium nitrite, potassium nitrite and mixtures thereof.

5. The method of claim 1, wherein the feed comprises a mixture of one or more nitrates and one or more nitrites with a percentage ratio of the weight between nitrates and nitrites of from 0:100 to 100:00.

6. The method of claim 1, wherein the feed further comprises vitamin C, vitamin E, or a mixture thereof.

7. The method of claim 1, wherein the feed further comprises a mineral selected from selenium, zinc, manganese, copper, or a mixture thereof.

8. The method of claim 1, further comprising slaughtering the poultry between 30 and 60 days counted from the day of hatching.

9. The method of claim 1, wherein the poultry is a broiler chicken and the pectoral myopathy is wooden breast and/or white striping myopathy.

* * * * *